(12) United States Patent
Newman

(10) Patent No.: US 6,419,313 B1
(45) Date of Patent: Jul. 16, 2002

(54) SEAT CUSHION WITH FLIP OPEN STORAGE BIN

(75) Inventor: Paul E. Newman, Troy, MI (US)

(73) Assignee: Magna Seating Systems Inc., Aurora (CA)

( * ) Notice: Subject to any disclaimer, the term of this patent is extended or adjusted under 35 U.S.C. 154(b) by 0 days.

(21) Appl. No.: 09/590,570

(22) Filed: Jun. 9, 2000

Related U.S. Application Data

(60) Provisional application No. 60/138,217, filed on Jun. 9, 1999.

(51) Int. Cl.[7] .................................................. A47C 7/62
(52) U.S. Cl. .............................. 297/188.1; 297/188.09; 296/37.15
(58) Field of Search .................... 297/188.1, 188.08, 297/188.09, 188.13, 188.01, 217.7, 452.22, 452.21, 452.6, 452.1, 452.25, 452.34; 312/235.2, 235.5, 327, 328; 296/37.15, 69, 65.01, 65.05

(56) References Cited

U.S. PATENT DOCUMENTS

| | | | |
|---|---|---|---|
| 3,099,482 A | * | 7/1963 | Woodruff, Sr. ......... 297/188.09 |
| 4,685,729 A | | 8/1987 | Heesch et al. |
| 4,854,261 A | * | 8/1989 | Goldsmith ........... 312/235.2 X |
| 4,883,317 A | | 11/1989 | Davenport |
| 5,249,724 A | | 10/1993 | Green |
| 5,533,783 A | | 7/1996 | Harms et al. |
| 5,622,404 A | | 4/1997 | Menne |
| 5,816,650 A | | 10/1998 | Lucas, Jr. |
| 5,848,820 A | | 12/1998 | Hecht et al. |
| 5,902,009 A | | 5/1999 | Singh et al. |
| 5,911,470 A | | 6/1999 | Aumond |
| 5,951,111 A | * | 9/1999 | Klimenko .......... 297/188.09 X |
| 6,102,463 A | * | 8/2000 | Swanson et al. ..... 297/188.1 X |
| 6,106,044 A | * | 8/2000 | Schlacter ................. 296/37.15 |
| 6,135,549 A | * | 10/2000 | Demick et al. .......... 297/188.1 |
| 6,139,096 A | * | 10/2000 | Anderson et al. ........ 297/188.1 |

FOREIGN PATENT DOCUMENTS

WO     WO/99/42329     8/1999

\* cited by examiner

*Primary Examiner*—Peter M. Cuomo
*Assistant Examiner*—Stephen Vu
(74) *Attorney, Agent, or Firm*—Clark Hill PLC

(57) ABSTRACT

A seat assembly for an automotive vehicle having a floor includes a seat frame secured to the floor of the automotive vehicle. A tray structure is secured to the seat frame. The tray structure includes a bin designed to have items stored therein. A seat cushion is divided into a number of cushion members wherein a portion of the cushion members are immovable with respect to the tray structure and a portion of the cushion members are movable with respect to the tray structure. The movable cushion members provide access to the bin in the tray structure. The movable cushion members pivot about a hinge with respect to the immovable cushion members. By maintaining the immovable cushion members in place, an occupant can still sit on the immovable cushion members while accessing the bin by pivoting the movable cushion members.

7 Claims, 3 Drawing Sheets

SEAT CUSHION WITH FLIP OPEN STORAGE BIN

CROSS-REFERENCES TO RELATED APPLICATIONS

This application claims the benefit of priority with U.S. provisional application No. 60/138,217 filing date Jun. 9, 1999.

BACKGROUND ART

1. Field of the Invention

The present invention relates generally to a seat assembly for an automotive vehicle, and more particularly to a seat assembly having a storage compartment under the seat cushion thereof.

2. Description of the Related Art

As the content of the automotive vehicle becomes more sophisticated, areas often left untouched are being converted to have increased functionality. One such area is below the seat cushion of a seat assembly. U.S. Pat. No. 5,816,650 discloses a storage bin for the area under the seat cushion. This patent discloses the cover of the underseat storage bin to be the entire seat cushion of the seat assembly. More specifically, the seat assembly includes two side walls that are disposed adjacent the guide tracks of the seat assembly. The seat assembly also defines a front end and a rear end. The seat cushion extends to these parameters, i.e., to the side walls, the front and rear ends. The seat cushion, being pivotally connected to the seat assembly near the front end, is pivoted upwardly away from the side walls to expose the underseat storage bin.

The disadvantages associated with this design include the inability to use a portion of the seat cushion while accessing the underseat storage bin and the unnecessarily increased difficulty in gripping the seat cushion or handle thereto due to the proximity of the seat cushion to the seat back.

SUMMARY OF THE INVENTION

A seat assembly is disclosed for use in an automotive vehicle. The seat assembly includes a seat frame that is secured to a floor of the automotive vehicle.

A seat back is secured to the seat frame. A tray structure is secured to the seat frame. The tray structure includes a bin for storing items therein. A first cushion member is secured to the tray structure covering a portion of the tray structure. The seat assembly also includes a second cushion member pivotally secured to the tray structure. The second cushion member is pivotal between a closed position covering the bin and an open position providing access to the bin wherein the second cushion member pivots with respect to the first cushion member.

BRIEF DESCRIPTION OF THE DRAWINGS

Other advantages of the invention will be readily appreciated as the same becomes better understood by reference to the following detailed description when considered in connection with the accompanying drawings, wherein.

DETAILED DESCRIPTION OF THE PREFERRED EMBODIMENT(S)

Figure 1:
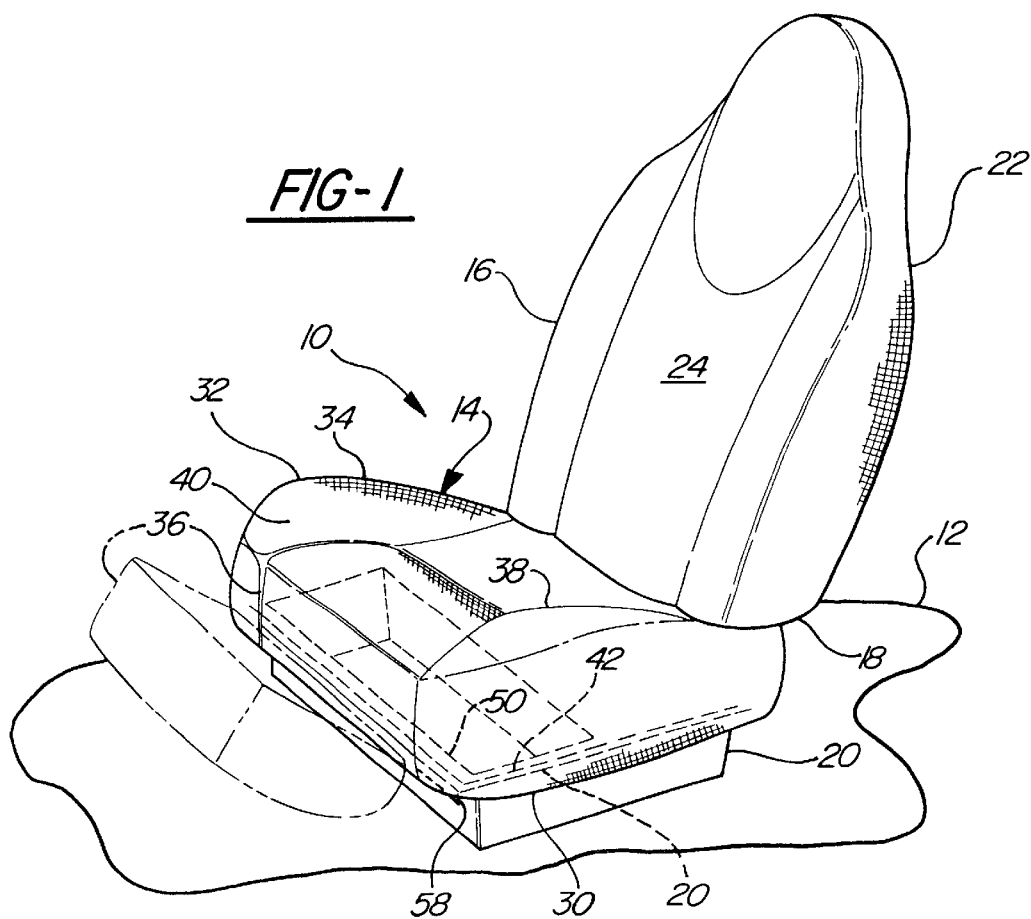
FIG. 1 is a perspective view of one embodiment of the invention shown in a passenger compartment, partially cut away.
Figure 3:
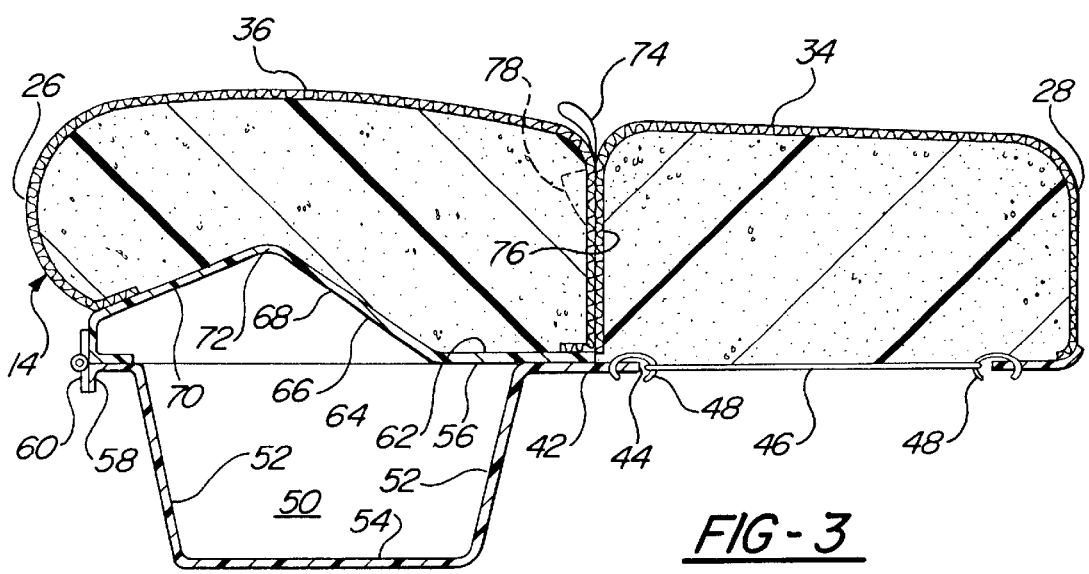
FIG. 3 is a cross-sectional side view of one embodiment of the invention.
Figure 2:
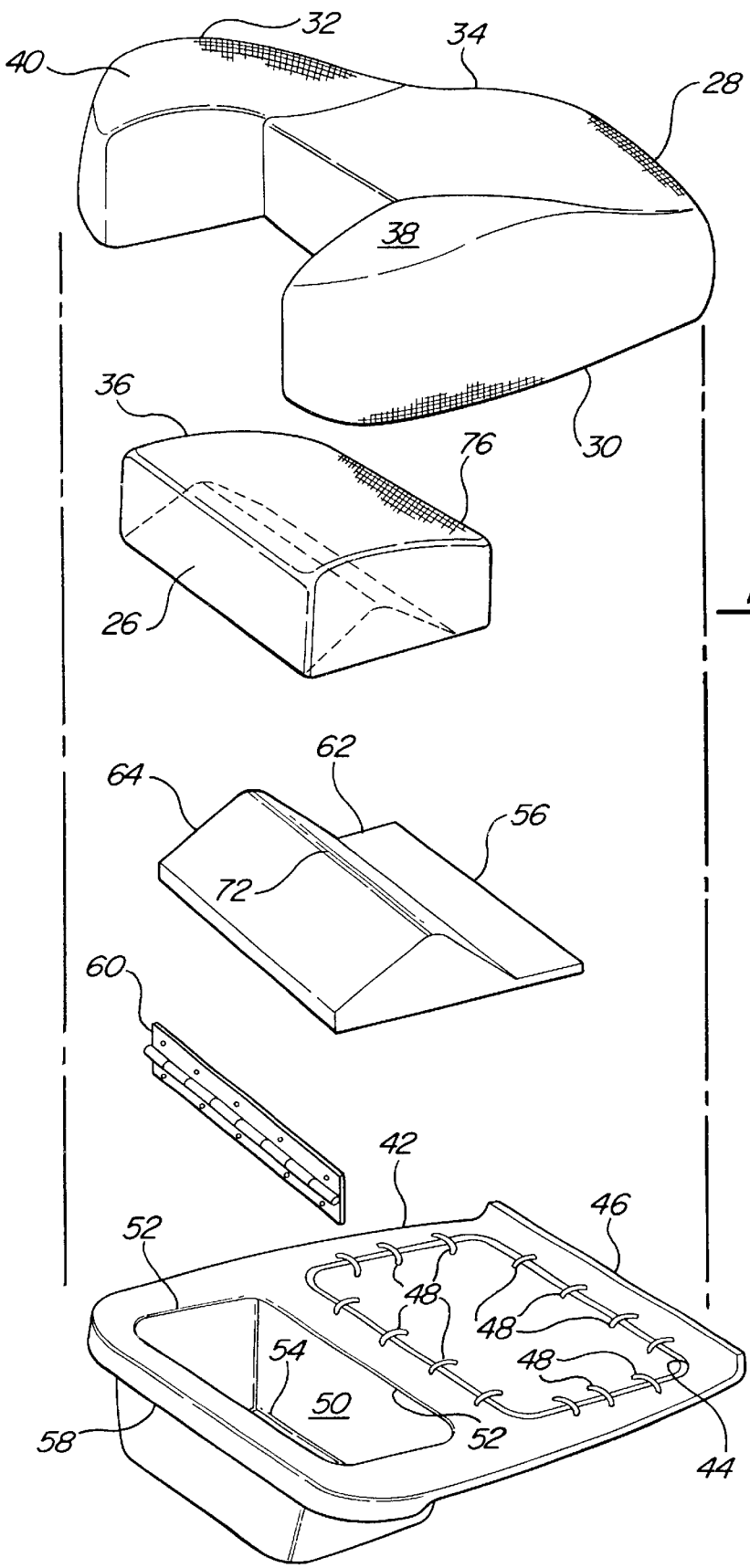
FIG. 2 is an exploded perspective view of one embodiment of the invention.

Referring to FIGS. 1 through 3, a seat assembly is generally depicted at 10 for supporting a seat occupant. The seat assembly 10 is secured to a floor 12 of an a passenger compartment of an automotive vehicle. The seat assembly 10 includes a seat cushion, generally indicated at 14, for supporting the seat occupant on the seat assembly 10 and a seat back 16 extending longitudinally between a lower portion 18 operatively connected to the seat frame 20 and an upper portion 22, as is commonly known in the art. The seat back 16 further includes a contoured front support surface 24 extending longitudinally between the lower portion 18 and the upper portion 22 for supporting the seat occupant in an upright seated position. It may be appreciated by those skilled in the art that the upper portion 22 of the seat back may have a headrest assembly formed integrally therewith as is shown in FIG. 1 or it may be a separate structure enactable with the upper portion 22 as is well known in the art.

The seat cushion 14 is movably secured to the seat frame 20. Typically, the seat cushion 14 and the seat back 16 move using a set of guide tracks. The guide tracks (not shown) may be secured to the floor 12 of the passenger compartment or, in the alternative, may be secured to a riser assembly that may be used depending on the profile of the seat assembly 10 and the contour of the floor 12.

The seat cushion 14 defines front 26, back 28 and two side 30, 32 surfaces. The seat cushion 14 includes at least two cushion members 34, 36. In the embodiment shown in the Figures, the first cushion member 34 extends from the back surface 28 up alongside the side surfaces 30, 32 whereas the second cushion member 36 is disposed adjacent the front surface 26. It may be appreciated that the first cushion member 34 may include multiple cushions. For example, two side bolsters 38, 40 could be independent cushions.

The first cushion member 34 is secured to the seat frame 20 through a tray structure 42. The tray structure 42 includes an opening 44. A suspension mat 46 extends over the opening 44. The suspension mat 46 is fabricated from a woven elastic material or a synthetic elastic material. The suspension mat 46 is shown being secured to the tray structure via clips 48. The clips 48 may include springs or have a spring-like quality to enhance the comfort of the seat assembly 10.

The tray structure 42 includes a bin 50. The bin 50 is a depressed area of the tray structure 42 suitable for storage of personal items, maps, tools and the like. The bin 50 includes a plurality of sides 52 and a bottom surface 54. While shown as a single depressed area, the bin 50 may include a plurality of depressed areas and/or compartments to help organize the items stored therein.

The tray structure 42 includes a bin lid 56 that is pivotal between a closed position over the bin 50 and an open position exposing the bin 50. The bin lid 56 is pivotally secured to the tray structure 42 at a front end 58 disposed adjacent the front surface 26 of the seat cushion 14. A hinge 60 extends along the front end 58 and secures the bin lid 56 thereto.

The bin lid 42 includes a tray-engaging portion 62 and a bin cover portion 64. The tray-engaging portion 62 is generally flat allowing it to rest on the tray structure 42 when the bin lid 42 is in the closed position. In an alternative embodiment not shown, the tray-engaging portion 62 may engage a portion of the seat frame 20 instead of the tray structure 42. In the preferred embodiment of FIGS. 1 through 3, the bin cover portion 64 includes convex surface, generally indicated at 66. The convex surface 66 includes two opposing surfaces 68,70 adjoining at an apex 72. The convex surface 66 strengthens the bin cover portion 64 across the bin 50 and provides an increased storage space allowing items to extend up over the tray structure 42 when the first seat cushion 34 is in its closed position.

A handle 74 is fixedly secured to a back side 76 of the second cushion member 36. The handle 74 facilitates the operator moving the second cushion member 36 from the closed position to the open position. Alternatively, a recess 78, shown in phantom in FIG. 3, may be used in place of the handle 74. Alternatively, the second cushion member 36 could be spring biased. In this alternative embodiment, a latch secured to the tray structure 42 would be used in conjunction with a catch on the second cushion member 36 to maintain the second cushion member 36 in the closed position.

Figure 4:
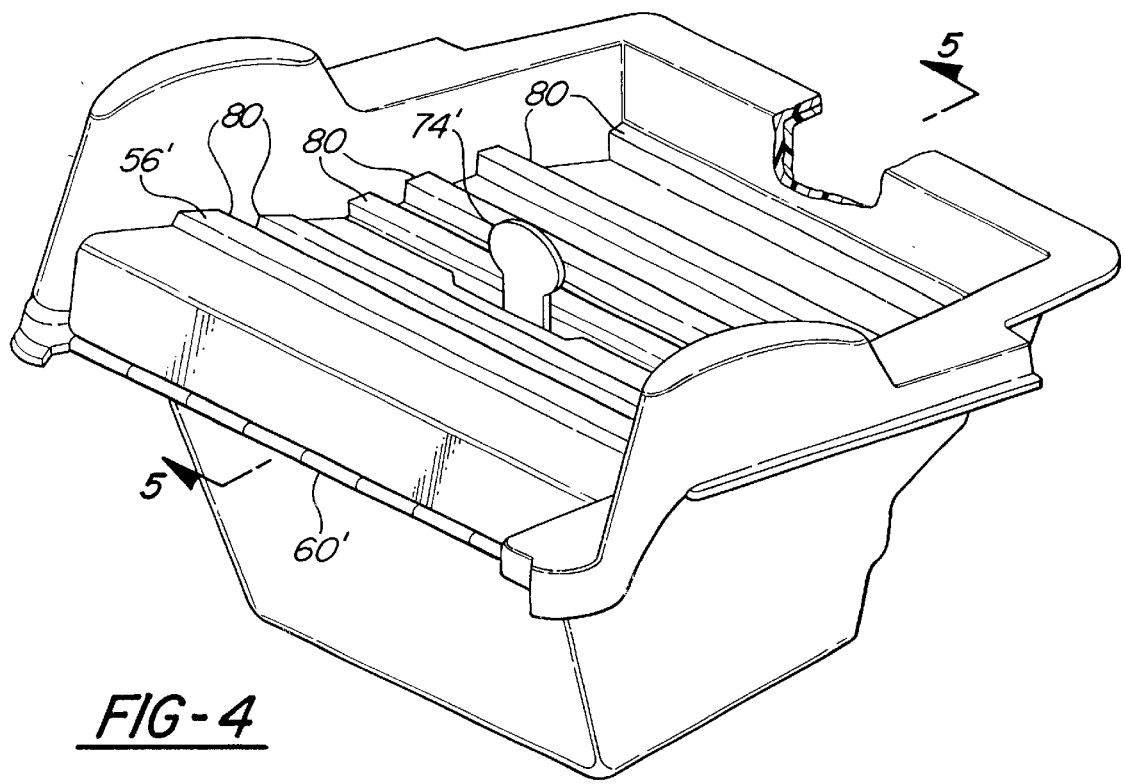
FIG. 4 is a perspective view, partially cut away, of an alternative embodiment of the invention.
Figure 5:
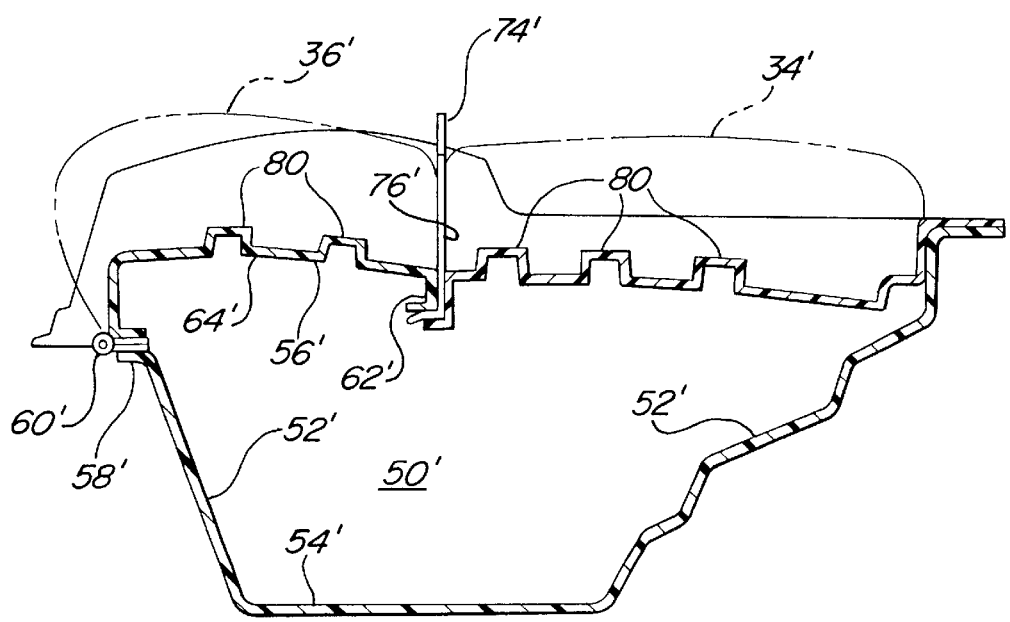
FIG. 5 is a cross-sectional side view taken along lines 5—5 of FIG. 4 with the seat cushion shown in phantom.

Referring to FIGS. 4 and 5, wherein like primed numerals represent similar structures to the elements of the first embodiment shown in FIGS. 1 through 3, the tray structure 42' would include a bin 50' which extends under the tray structure 42'. The suspension mat 46 of the first embodiment is replaced with a solid tray structure 42' having a plurality of ribs 80 extend along the tray structure 42' to add strength thereto.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

We claim:

1. A seat assembly for use in an automotive vehicle having a floor, said seat assembly comprising:

a seat frame fixedly securable to the floor of the automotive vehicle;

a seat back secured to said seat frame;

a tray structure secured to said seat frame, said tray structure including a front end and a bin for storing items therein, said tray structure including a bin lid supported thereby and pivotally movable between a closed position covering said bin and an open position providing access to said bin;

a first cushion member secured to said tray structure covering said tray structure, said first cushion member including two side bolsters extending out therefrom; and a second cushion member pivotally secured to said tray structure and extending between said two side bolsters of said first cushion member, said second cushion member pivotal between a closed position covering said bin and an open position providing access to said bin wherein said second cushion member pivots with respect to said first cushion member.

2. The seat assembly as set forth in claim 1 wherein said bin lid includes a hinge extending along said front edge of said tray structure.

3. The seat assembly as set forth in claim 2 wherein said bin lid includes a tray engaging portion.

4. The seat assembly as set forth in claim 3 wherein said bin lid includes a convex bin cover portion extending within said tray engaging portion.

5. The seat assembly as set forth in claim 4 wherein said second cushion member is fixedly secured to said bin lid.

6. The seat assembly as set forth in claim 5 wherein said bin extends under said tray structure.

7. The seat assembly as set forth in claim 1 wherein said second cushion member is fixedly secured to said bin lid.

* * * * *